Figure 1:
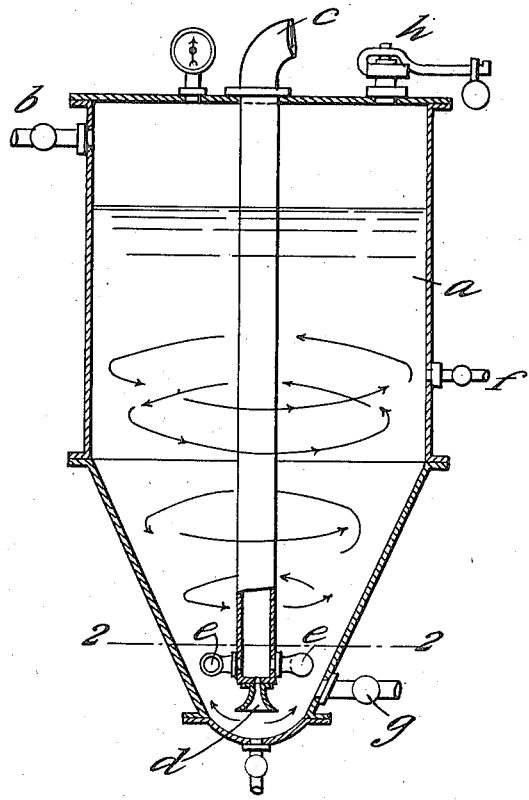

F. H. SHARPE.
PROCESS OF CARBONATING LEAD OXID.
APPLICATION FILED JULY 12, 1915.

1,196,595.

Patented Aug. 29, 1916.
2 SHEETS—SHEET 1.

Witnesses:
M. E. McDade.

Inventor
Frederick H. Sharpe
by
Attorney

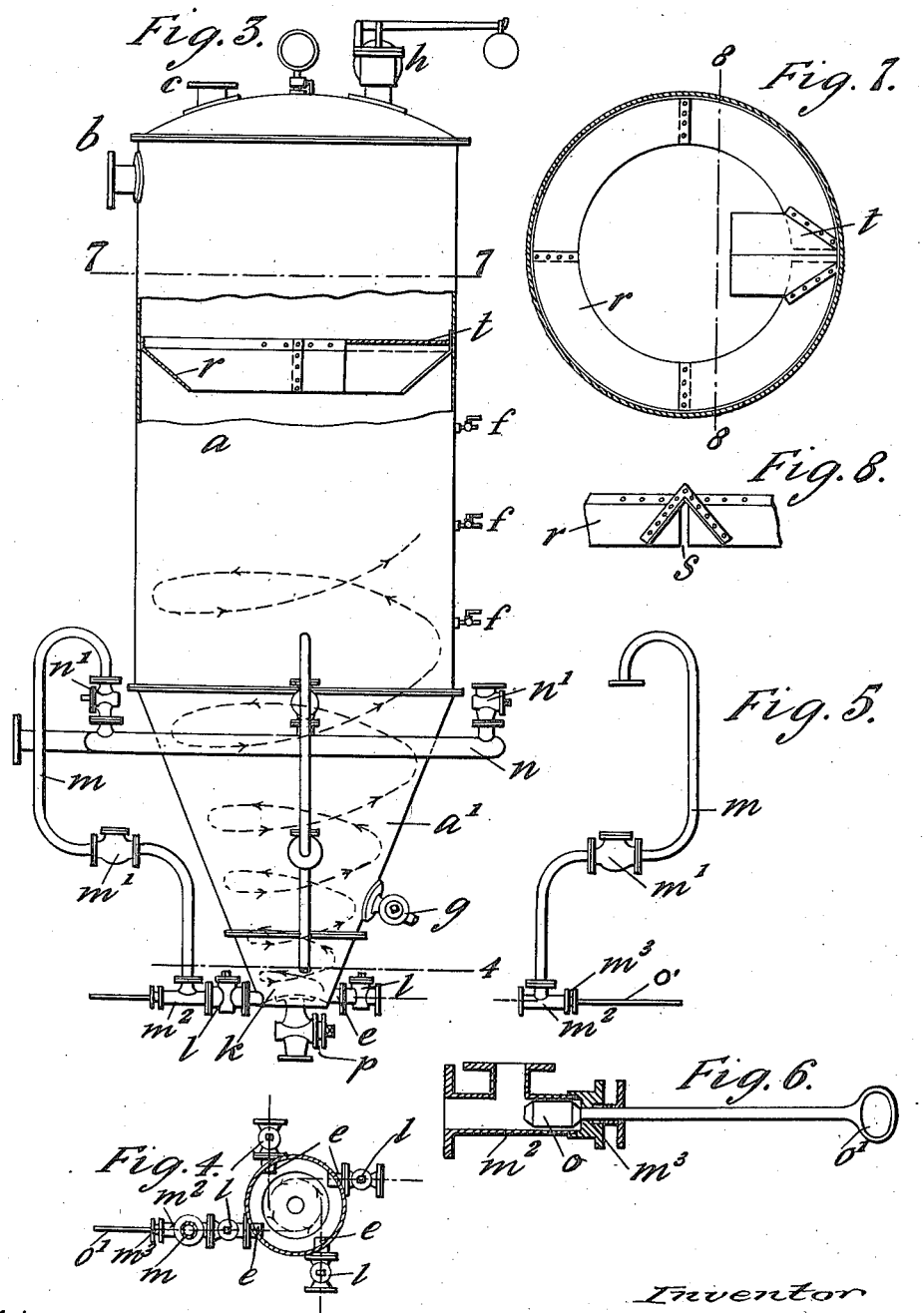

UNITED STATES PATENT OFFICE.

FREDERICK HERBERT SHARPE, OF LIVERPOOL, ENGLAND.

PROCESS OF CARBONATING LEAD OXID.

1,196,595.

Specification of Letters Patent.

Patented Aug. 29, 1916.

Application filed July 12, 1915. Serial No. 39,448.

*To all whom it may concern:*

Be it known that I, FREDERICK HERBERT SHARPE, a subject of the King of Great Britain, residing in Liverpool, England, have invented a certain new and useful Improved Process for Carbonating Lead Oxid, of which the following is a specification.

The process of making white lead by passing carbon dioxid or a mixture of this gas with another gas or other gases through lead oxid suspended in water containing an assistant, such as a small proportion of acetic acid, is well known. In carrying out the process, however, great difficulty has been experienced in maintaining the solid and liquid in efficient contact with the gas, with the result that a large proportion of the gas passes through the apparatus without being utilized. This arises in part from the high specific gravity of the lead oxid, which causes it to settle very quickly and in general the only way found practicable up to the present to meet the difficulty has been to vigorously stir the mixture mechanically. This is, however, costly. Another solution of the difficulty is that described in the specification of my prior United States Patent No. 1,088,460, in which as applied to the continuous manufacture of white lead, a series of vessels is used through which the liquid with its suspended matter is passed consecutively and the gas is forced simply under pressure through the mixture in each vessel in turn. Experience with this process has shown that carbonation may vary in the different vessels and has suggested to the applicant that with a suitably constructed and arranged vessel the carbonation process might be carried out in one vessel and the mixture kept efficiently stirred without the use of any mechanical means for the purpose.

Other main objects which I desire to accomplish by this invention are, to use ordinary commercial or unfused lead oxid containing either free metallic lead or no metallic lead which it has been thought impossible to use in a single vat process because of the metallic lead which has been left uncarbonated, to carbonate continuously, and to utilize carbonic acid gas of varying strengths.

The present invention to this end comprises a process for the manufacture of white lead in a single vat wherein lead oxid suspended in water containing an assistant is charged into the vat and carbon dioxid containing gas such as carbon dioxid alone or carbon dioxid mixed with another gas or other gases, is introduced into the vat at or near the bottom in such a manner as to prevent settlement of the white lead and to cause thorough and efficient contact between the gas, the solid and the liquid.

The invention will be described with reference to the accompanying drawings.

Figure 2:
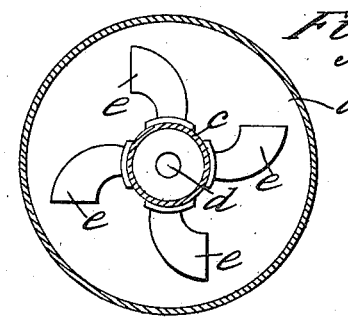

Figure 1 is a vertical section through a vat for carbonating lead oxid constructed according to the invention. Fig. 2 is a section on line 2—2 of Fig. 1 drawn to an enlarged scale. Fig. 3 is an elevation with part shown in section through another arrangement of vat. Fig. 4 is a section on line 4—4 of Fig. 3. Fig. 5 is a detail view showing one of the gas supply pipes disconnected. Fig. 6 is another detail view showing one of the jet cleaning plungers. Fig. 7 is a horizontal section on line 7—7 of Fig. 3 showing a baffle ring. Fig. 8 is a partial elevation on line 8—8 of Fig. 7.

The mixture of lead oxid, water and a small proportion of acetic acid is run into the vat $a$, which preferably tapers inwardly toward the bottom through a cock $b$. The carbonating gas which may be substantially pure carbon dioxid or fuel gases, for example, is pumped through a pipe $c$, the delivery end of which is provided with a bell-mouthed extension $d$ directed toward the spherically curved bottom of the vat and situated within a short distance thereof. Close to the said delivery end, there project at right angles to the axis of the pipe four short curved horizontal pipes $e$, also bell-mouthed. The cross sectional areas of these four pipes at their junction with pipe $c$ and the cross sectional area of the extension $d$, at its junction with pipe $c$, are together preferably slightly less than the cross sectional area of pipe $e$, so as to insure that there shall always be an excess pressure in pipe $c$.

When the gas has been passed into the vat for some time a sample of the contents is removed through the test cock $f$ and when such a sample shows that the lead oxid has been carbonated to the desired degree, cock $g$ is opened, whereupon the pressure of gas in the vat expels the liquid and solid contents. Cock $g$ is now closed and more mixture is pumped in through cock $b$, the stream of gas being continued the while, so that the process may be said to be practically continuous.

The blow-off valve $h$ may be loaded to give any desired pressure within the vessel. Working under pressure is not essential but has the advantage that it aids the intimate contact of the gas with the mixture and prevents the excessive frothing which would occur in an open vessel.

If the quantity of metallic lead in the oxid be abnormally large, air may be forced through a separate opening in the vat so as to insure the oxidation of this lead which might otherwise escape carbonation owing to insufficiency of the accidental oxygen in the carbonating gases.

Should apparatus such as that above described be allowed to stand for any reason, any lead oxid in the vat at once settles to the bottom and may have a tendency to choke the gas delivery, jets $d$ and $e$, in which case it is necessary to remove the pipe $c$ and the jets to clear them, the apparatus at the same time being put out of use. The arrangement shown in Figs. 3 to 6 has been designed to obviate such a difficulty. The vat $a$ is preferably similar in shape to that shown in Fig. 1, that is to say it is constructed tapering inwardly toward the bottom so that the lower portion $a'$ of the vat is of more or less conical shape and the actual bottom $k$ of the vat is preferably made of comparatively very small size and slightly domed or conical as shown so as to throw anything falling on it down to the edges. At or near the bottom of the vat are arranged one or more jets $e$ introduced through the walls of the vat and directed more or less tangentially to said walls. Preferably, the direction is slightly more toward the center of the vat than the true tangential direction. The direction of the jets may also if desired be slightly downward toward the bottom of the vat.

Where one jet $e$ is used the lower portion $a'$ of the vat may be carried more nearly to a point and the area of the jet may be made greater than the area of the actual bottom of the vat. It is, however, preferable to employ a plurality of jets $e$ as shown, because by this means the agitation of the material is more readily produced and maintained and it is possible as hereinafter described to clean one jet while the others are continuously in operation.

Each of the jets $e$ is provided with a preferably full bore cock 1 adjacent to it, by which it can be shut off, and with a removable connecting pipe $m$ (see Fig. 5) removably attached beyond the cock 1 by which it is connected with the main gas supply $n$. A cock $n'$ is also provided between the main supply $n$ and each of the pipes $m$ so arranged that the gas can be shut off from each pipe $m$ individually to permit of its being disconnected and removed without interfering with the supply to the other pipes. Each pipe $m$ is preferably made in two sections as shown with a non-return valve $m'$ arranged between them, to prevent any back pressure in the vat forcing the material in the vat back into or along them.

When it is desired to clean or inspect one of the jets $e$ or its connecting pipe $m$, the cocks $l$ and $n'$ corresponding are closed and the pipe $m$ is disconnected. It can then be inspected and cleaned, its two separate sections being disconnected from the non-return valve $m'$ if found necessary. A plug is then inserted in the bore of the cock $l$, the cock is opened and the plug is pushed into the vat to clean out the jet and then withdrawn, the cock $l$ being closed again, before the plug is finally removed. Or, as shown in the drawings (see especially Fig. 6) a plug $o$, permanently arranged in a suitable recess in the pipe $m$ and in line with the corresponding jet $e$ may be provided for cleaning each jet. The plug $o$ is preferably arranged as shown in a separate junction piece $m^2$ and is provided with a handle $o'$ passing through a stuffing box $m^3$ by which it can be operated.

The vat is provided with a cock $g$ by which the contents may be evacuated and may be provided with a second cock $p$ at the bottom by which any sediment collected in the bottom may be removed from time to time.

In operation, after the vat has been filled and the gas has been turned on, a rapid vertical movement is set up in the vat owing to the direction of flow of the gas under pressure through the jets. The gas at the same time tends to rise up the sides of the vat passing around and around them more or less in a helical direction. At the same time the oxid of lead which is thrown to the sides by the centrifugal action tends to fall so that it is brought into intimate contact with the rising gas. A more or less general circulation of the liquid is also produced upward along the sides of the vat and downward in the more quiescent center of the vat.

In order to increase the agitation and prevent too regular a circulation of the liquid and also to more efficiently use up the gas, one or more circular, preferably downwardly inclined baffles $r$ (see Figs. 3, 7 and 8) may be arranged in the upper part of the vat. Such baffles $r$ may extend almost around the vat leaving a narrow space $s$ between the ends which is covered over with an angle plate $t$ projecting outward toward the center of the vat. Such baffles trap a portion of the rising gas which is led through the space s and the gable t toward the center of the vat and rises against the downwardly circulating liquid.

One or more test cocks f are provided in the side of the vat.

When the carbonation is completed, the cock g is opened, the contents being forced out by this cock under the pressure of gas in the vat, the gas inlet valves being left open while the vat is evacuated. Directly the vat is emptied the cock g is closed and the new material is fed into the vat without shutting off the gas supply. In this way, agitation and carbonation of the new material as it is added begins immediately so that carbonation is continuous and no time being allowed for standing no settlement can take place in the vat.

A blow-off valve h for regulating the pressure in the vat may be employed with reference to Figs. 1 and 2.

The gas passing from the vat may be allowed to escape to the atmosphere, or if of sufficient strength it may be passed through a second vat, but when this is done there is no other connection between the vats, the complete process of carbonation taking place in a single vat.

The apparatus is not claimed herein, but is reserved to form the subject-matter of a divisional application.

Having thus described my invention and the best means I know for carrying the same into practical effect I claim:—

1. A single vat process for the manufacture of white lead, in which lead oxid suspended in water in conjunction with an assistant is introduced into a closed vat and carbon dioxid containing gas is introduced into the vat at or near the bottom and with a swirling motion so as to prevent settlement of the solid material and to cause thorough and efficient contact between the gas, the solid and the liquid.

2. A single vat process for the manufacture of white lead, in which lead oxid suspended in water in conjunction with an assistant is introduced into a closed vat and carbon dioxid containing gas is introduced more or less tangentially into the vat at or near its bottom and tends to rise in a more or less helical direction up the sides, at the same time giving a swirling movement to the water and its suspended lead oxid.

3. A single vat process for the manufacture of white lead, in which lead oxid suspended in water in conjunction with an assistant is introduced into a closed vat and carbon dioxid containing gas is introduced through a plurality of jets more or less tangentially into the vat at or near its bottom.

4. A single vat process for the manufacture of white lead, in which lead oxid suspended in water in conjunction with an assistant is introduced into a closed vat and carbon dioxid containing gas is introduced into the vat so as to cause the material therein to swirl upwardly and outwardly against a conical wall in the lower part of the vat and cause a downward flow of material in the middle of the vat.

5. A single vat process for the manufacture of white lead, in which lead oxid suspended in water in conjunction with an assistant is introduced into a closed vat and carbon dioxid containing gas is introduced more or less tangentially into the vat at or near its bottom and tends to rise in a more or less helical direction up the sides, at the same time giving a swirling movement to the water and its suspended lead oxid, a portion of the gas as it rises being deflected toward the center of the vat to cause it to rise against the downward flow of water and its suspended lead oxid.

6. A single vat process for the manufacture of white lead, in which lead oxid suspended in water in conjunction with an assistant is introduced into a closed vat and carbon dioxid containing gas is introduced through a plurality of jets more or less tangentially into the vat at or near its bottom.

In testimony whereof I have signed my name to this specification in the presence of two subscribing witnesses.

FREDERICK HERBERT SHARPE.

Witnesses:
  GEO. W. EDWARDS,
  RICHARD W. GELDART.